US010124856B2

(12) United States Patent
Cederstrom

(10) Patent No.: US 10,124,856 B2
(45) Date of Patent: Nov. 13, 2018

(54) AEROBAR-MOUNTED ROTATIONAL TORQUE SURGE BRAKE FOR A BICYCLE

(71) Applicant: Jeffrey John Cederstrom, Bay City, MI (US)

(72) Inventor: Jeffrey John Cederstrom, Bay City, MI (US)

(*) Notice: Subject to any disclaimer, the term of this patent is extended or adjusted under 35 U.S.C. 154(b) by 86 days.

(21) Appl. No.: 15/330,552

(22) PCT Filed: Jul. 18, 2016

(86) PCT No.: PCT/US2016/042716
§ 371 (c)(1),
(2) Date: Oct. 11, 2016

(87) PCT Pub. No.: WO2017/015181
PCT Pub. Date: Jan. 26, 2017

(65) Prior Publication Data
US 2017/0253292 A1 Sep. 7, 2017

Related U.S. Application Data

(60) Provisional application No. 62/194,327, filed on Jul. 20, 2015.

(51) Int. Cl.
*B62L 3/02* (2006.01)
*B62K 21/12* (2006.01)
*B62K 23/04* (2006.01)
*B62M 25/04* (2006.01)

(52) U.S. Cl.
CPC .............. *B62L 3/026* (2013.01); *B62K 21/12* (2013.01); *B62K 23/04* (2013.01); *B62L 3/02* (2013.01); *B62M 25/04* (2013.01); *B62K 21/125* (2013.01)

(58) Field of Classification Search
CPC .......... B62L 3/02; B62L 3/026; B62K 21/12; B62K 23/04; B62K 21/125; B62M 25/04
USPC ..................................... 74/551.8, 551.1, 489
See application file for complete search history.

(56) References Cited

U.S. PATENT DOCUMENTS

| 4,653,613 | A | 3/1987 | Blancas |
| 4,966,047 | A | 10/1990 | Kroner et al. |
| 6,488,130 | B1 | 12/2002 | Bermel |
| 8,534,690 | B2 * | 9/2013 | Price .................. B62M 1/12 280/233 |
| 9,725,129 | B2 * | 8/2017 | Poole ................... B62K 21/12 |
| 2006/0090589 | A1 * | 5/2006 | Ording ................. B62K 21/12 74/551.8 |
| 2012/0200061 | A1 | 8/2012 | D'Aluisio |

(Continued)

*Primary Examiner* — Anne Marie M Boehler
*Assistant Examiner* — Marlon A Arce
(74) *Attorney, Agent, or Firm* — Price Heneveld LLP

(57) ABSTRACT

A rotational torque surge brake assembly mounted to a bicycle aerobar that provides an ergonomic brake design allowing riders utilizing aerobars to brake using a natural supination motion of the forearm while remaining in the tucked, aerodynamic racing position. Braking is activated by supine radial rotation of an actuating handle grip (6) mounted rotatably about a base mounting member (7) that is itself affixed to an aerobar (9) mounted on the bicycle handlebar. The bicycle's brake cable is attached to the handle grip (6) in such a manner that radial motion of the handle (6) results in axial motion of the brake cable (10), relative to the axis of the bicycle frame.

12 Claims, 2 Drawing Sheets

(56) References Cited

U.S. PATENT DOCUMENTS

2012/0272777 A1* 11/2012 Tolhurst .............. B62K 21/125
                                                          74/491
2015/0145230 A1   5/2015 Poole
2016/0176468 A1*  6/2016 Poole .................... B62K 21/12
                                                          280/263

* cited by examiner

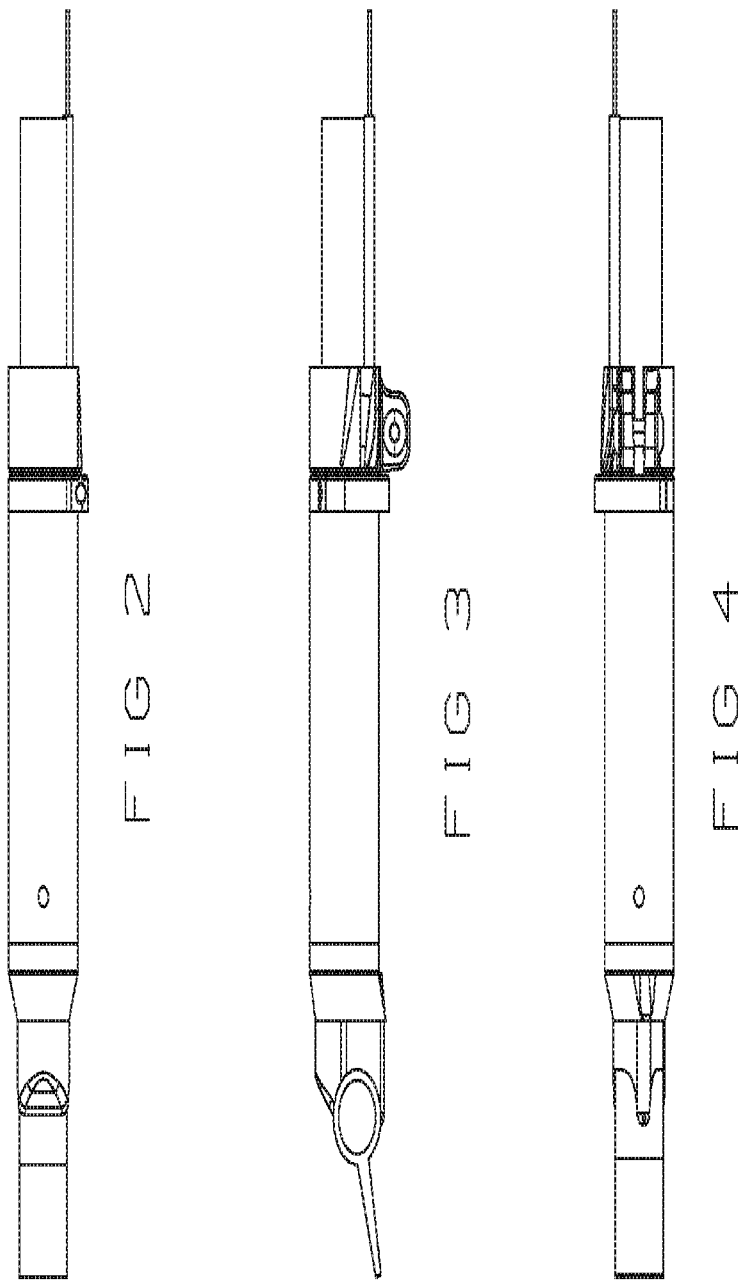

AEROBAR-MOUNTED ROTATIONAL TORQUE SURGE BRAKE FOR A BICYCLE

FIELD OF INVENTION

This invention relates to a hand operable aerobar-mounted braking system for bicycles equipped with various cable operated braking systems. The invention provides an ergonomic brake design that allows riders utilizing aerobars to brake using a natural supination motion of the forearm while remaining in the tucked "aero" position. Remaining in the aero position allows for increased rider stability and speed, while also decreasing the reaction time to respond to the need to apply the brakes.

BACKGROUND OF INVENTION

The aerobar-mounted rotational torque surge brake is designed to meet a niche braking need for cyclists, particularly those involved in bicycle racing, including triathletes. Triathlons have grown in popularity over the past five to ten years. Triathlons are different than traditional road biking racing. In road racing, drafting in a pack of cyclists is an accepted, if not celebrated practice. Road cyclists practice drafting techniques as they train, taking turns in the lead position "pulling," followed by others riding as close to the cyclists in front of them as possible to get the best possible draft. Conversely, drafting in a triathlon is a disqualifiable offense. Triathletes must blaze their own path through the wind without the assistance of other riders giving them an aerodynamic "pull," As a result, the effect of wind resistance is amplified for the triathlete. The aerobar is a useful tool for the reduction of wind resistance, as it allows the rider to get into a more compact and tucked aerodynamic position.

Aerobars can be found on time trial racing road bicycles or triathlon bicycles. Aerobars allow riders to get into a tucked aero position, thereby increasing their aerodynamics and speed. However, the aerobar takes the rider's hands away from the hand brakes conventionally mounted on the outer portion of the handle bars. As a result, in order to apply the brakes, the rider has to lift out of the aero position and move his or her hands to the brakes while continuing to maintain balance and concentrate on the road ahead. This makes it extremely dangerous for cyclists with aero bars to train or ride in an aerodynamic, single file line with conventional road bicycles.

While gear shifters and conventional lever operated brakes have been mounted on the end of aero bars for a number years, the idea of a torsional surge brake attached to aero bars is unique. The design of the current invention is novel in that the cyclist applies rotational torque (i.e. forearm supination), which pulls the brake cable in the axial direction. Much like turning a screwdriver, this motion is very natural when in the tucked aero position. As a result, this design allows riders faster reaction time to either modestly scrub speed or brake the bicycle. The combination of the brake's location, its unique activation motion, and the possibility for custom hand grips, brings substantial added value to the field in terms of rider stability and control.

With the rider in the aero position and the rider's hand remaining on the aerobar rotational torque surge brake handle at all times, the rider has the opportunity for increased control of the degree of braking, allowing him or her to merely scrub speed or alternatively, to stop the bicycle rapidly as conditions require at any time, and without any delay to reposition the hand or fingers. The braking action is completed by twisting the brake handle radially relative to the aerobar between 5 and 30 degrees, which in turn retracts the brake cable connected to the brake calipers proportionately. Because of the natural supination motion required for activation of the aerobar torque surge brake, the braking motion is not impacted by forward or backward momentum of the rider's body, which could affect the rider's braking time and control of the bike.

Handlebar-mounted bicycle hand brakes are well known in the prior art. U.S. Pat. No. 4,653,613 ("Blancas") discloses a rotation actuated internal lever braking system for bicycles, utilizing a handlebar-mounted grip. The Blancas specification recites that conventional lever-operated bicycle handlebar brakes require the operator to shift hand position such that the rider virtually relinquishes his or her grip on the handlebars, thereby reducing the rider's control of the bicycle during braking.

Blancas purports to solve this problem by providing a system operated by manual rotation of the handle bar grip assemblies without any change in the rider's firm, controlling grasp on conventionally oriented handle bars. A cable pulling lever and a grip assembly are each secured to one of the handle bars of the bicycle, the lever pivotally upon and the grip rotationally about the handle bar. The lever and grip assembly are mechanically connected so that uni-directional rotary motion of the hand grip operates the lever to translate an end of a flexible cable connecting the lever with a wheel braking device.

U.S. Pat. No. 5,005,674 ("Piatt") discloses a handle bar braking system comprising a conventional cable operated, pull braking system combined with a pair of bi-directional, rotatable grip subassemblies that provide braking action without a change in the rider's grip on the conventionally oriented handlebars. Braking action is activated by the rider through either a clockwise or counter-clockwise rotation about the axis of the handle bars, which provides riders with an alternative method of braking control.

Both Blancas and Piatt disclose a hand brake mechanism mounted perpendicularly relative to the direction of travel, which requires the rider to engage in a forward or rearward rotational motion of the hands that is parallel to the direction of travel of the bicycle. This results in a small forward or rearward shift in rider momentum that could significantly impact the degree of the rider's braking control in racing situations.

Aerobars are also well known in the art, and provide commonly understood advantages for racing bicycles, as they allow the rider to improve aerodynamics and increase speed by gripping the handlebar-mounted aerobar and assuming and maintaining a forward aero position. U.S. Pat. No. 7,698,967 ("Ording"), for example, discloses bicycle handlebars with removable and adjustable aerobar(s).

Ording recites a handle bar assembly having an axis generally perpendicular to the direction of travel of the bicycle, and removable, adjustable aerobars oriented in a direction generally parallel to the direction of travel of the bicycle. The use of lever operated brakes and brake cable splitting devices to install braking levers in multiple locations on bike handle bars is also known in the field. Use of a splitter allows a single bicycle brake assembly to be operated by multiple levers, one of which may be mounted to the end of an aerobar assembly.

Neither Blancas, Piatt, nor Ording adequately addresses the unique needs for an ergonomically designed braking system that does not sacrifice the aerodynamic and speed advantages provided by the use of aerobars in the racing environment. Unlike Blancas, Piatt, or Ording, the present invention provides a braking mechanism designed to give the fastest braking reaction times, while still allowing the rider to reduce speed or stop in a controlled manner without the loss of stability and control associated with a required change in hand or finger position. The present invention describes an alternative and novel braking system that can be mounted to a variety of commercially available aerobars. The invention allows the rider in the aero position to reduce speed through a natural ergonomic supination of the forearm without a change in hand or finger position, in this way eliminating the impact of unwanted forward or backward momentum of the rider's body along the axis of travel of the bicycle, and consequently increasing the rider's control of the bicycle whilebraking.

The present invention is also readily distinguishable from the use of lever operated brakes on commercially available aerobars. The invention provides a novel alternative which is an aerodynamic and ergonomic improvement as compared to lever brakes. With use of the rotational torque surge brake, the rider's reaction time is reduced, thereby improving braking control, relative to aerobar mounted lever brakes, which require the rider to move the hands or fingers from the full aero position. The natural, ergonomic motion of the brake handle grip assembly also improves rider stability during critical racing maneuvers, as compared to lever operated brakes.

SUMMARY OF THE INVENTION

The present invention is directed to a rotational torque surge brake assembly mounted to the distal end of a bicycle's aerobar assembly. In accordance with this invention, it has been discovered that the rotational torque surge brake allows the rider to apply the bicycle's brakes without moving the hands or fingers from the aerobar assembly or otherwise needing to change hand or finger position. The ability to maintain the hand and forearm position on the aerobar through a natural ergonomic braking process results in significantly increased stability and braking control for the rider.

In one aspect of the invention, the rotational torque surge brake comprises a base mounting sheath attached coaxially to an aerobar assembly which is itself affixed to the handlebars of a bicycle, a curved transition channel embedded within the mounting sheath to redirect the bicycle's brake cable from the axial direction to radial direction relative to the position of the longitudinal axis of the bicycle, an actuating handle grip, a suitable brake cable anchoring point on the actuating handle, a means for affixing the actuating handle rotatably to the mounting sheath while still allowing rotational motion of the actuating handle, and a suitable means for attaching the brake assembly to the distal end of the aerobar assembly. The brake cable is attached to the actuating handle grip in such a manner that radial motion of the handle results in axial motion of the brake cable, relative to the axis of the bicycleframe.

In another aspect of the invention, only a small degree of rotation via supination of the forearm is required to actuate the rotational torque surge brake, further enhancing the increased control during braking provided by the rotational torque surge brake.

Definitions

For purposes of the present invention, as described and claimed herein, the following terms and phrases are defined as follows:

"Aero position" as used herein, unless otherwise indicated, refers to a more aerodynamic riding position in which the bicycle rider places the forearms and hands on the aerobars, which are mounted in an orientation parallel to the direction of travel of the bicycle. After placing the forearms and hands in the aerobar position, the rider brings the upper body forward in a tight "tuck" position, while also keeping the legs in close contact with the center bar of the bicycle.

DESCRIPTION OF THE DRAWINGS

In the drawings, which represent the best mode presently contemplated for carrying out the invention.

FIG. 2 is a top view of the rotational torque surge brake assembly;

FIG. 3 is a side view of the rotational torque surge brake assembly; and

FIG. 4 is a bottom view of the rotational torque surge brake assembly.

DETAILED DESCRIPTION

Figure 1:
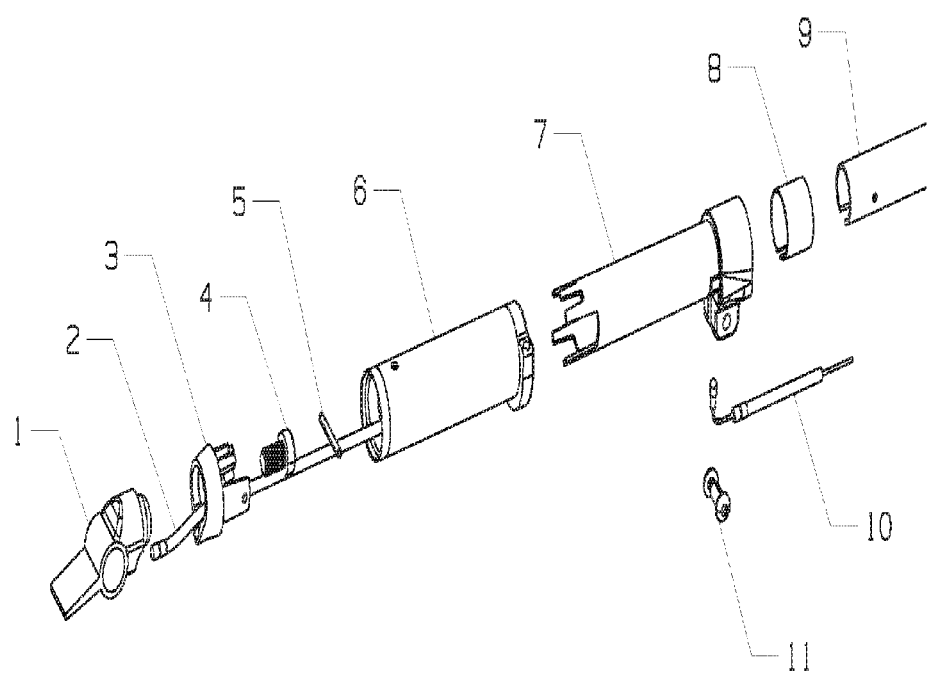
FIG. 1 is an exploded view of the rotational torque surge brake assembly.

The present invention, as shown in FIGS. 1 through 4, provides a novel and inventive rotational torque surge brake assembly that is capable of being attached to commercially available aerobars mounted on a suitable bicycle. The invention allows the operator of the bicycle to reduce speed or stop in a controlled fashion without leaving the racing aero position made possible by the aerobars, and without moving hand, finger or arm position on the aerobar grips, thereby increasing the level of stability and control for the rider, while also maintaining all of the aerodynamic advantages of the aerobars and the area position.

The invention includes two primary components, a base mounting sheath, and an actuating handle, and optionally, a shifter cable transition piece, and comprises at least the following individual components:

1. A flexible cable operable braking device for at least one of the wheels.
2. A sheathed flexible cable 10 connected to the wheel's braking device(s) and extending therefrom to at least one aerobar assembly 9 mounted to the bicycle's handle bars.
3. A base mounting sheath bushing 7 fixedly secured to and coaxial with the aerobar assembly 9, secured by means of a pliable bushing 8 and a suitable fastener 11.
4. A brake cable guiding channel formed within the proximate end of the base mounting sheath bushing 7.
5. At least one actuating handle grip 6 having means for its mounting rotatably and coaxially upon the base mounting sheath bushing 7.
6. A means of anchoring the end of the sheathed flexible brake cable 10, which ultimately connects to the wheel braking device itself, to the actuating handle grip 6 so that motion imparted to the end of the end of the flexible brake cable 10 in the radial direction produces axial tensioning of the brake cable along the axis of the bicycle frame via a radiused transition channel in the base mounting sheath bushing 7. The anchoring means includes: an attachment point for the flexible brake cable 10 formed within the actuating handle grip 6, in the form of a slotted brake cable endstop seat, and a suitable means for the flexible brake cable sheath 10 to seat into the proximal end of the base mounting sheath bushing 7.

Optionally, the invention further comprises a commercially available aerobar gear shifting device 1 is attached to the shifter cable transition piece 3 with a threaded fastener 4. The shifter cable transition piece 3 is fastened to the aero bar through a combination of a roll pin 5 that holds the cable transition piece in place, and alternating tabs that mesh with corresponding slots located at the distal end of the base mounting sheath bushing 7. This method of attachment of the cable transition piece 3 to the base mounting sheath bushing 7 firmly affixes the cable transition piece 3 to the base mounting sheath bushing 7, while still allowing the necessary free rotational motion of the actuating handle grip assembly 6.

With reference to FIG. 1, a suitable gear shifting lever assembly 1 is attached to the shifter cable transition piece 3 by a threaded fastener 4 at the distal end of the aerobar assembly. A suitable longitudinal transition channel allows clearance for unrestricted passage of a gear shift cable 2 through rotational torque surge brake assembly and the central cavity within the aerobar 9. The gear shift cable 2 passes longitudinally through the cavity in the center of the aerobar assembly 9 and ultimately passes outside the aerobar cavity to the bike's gear shifting mechanism.

The base mounting sheath bushing 7 is affixed to the aerobar assembly 9 through utilization of an integrated mounting clamp formed on the proximal end of the base mounting sheath bushing 7, a pliable bushing 8 inserted within the integrated mounting clamp, and a suitable fastener, such as a two-piece threaded fastener 11.

Alternating tabs at the distal end of the base mounting sheath bushing 7 mate with the shifter cable transition piece and retain the actuating handle grip 6 while still allowing radial rotation of the actuating handle grip about the longitudinal axis of the aerobar assembly.

A slotted brake cable endstop anchoring seat located within the actuating handle grip 6 serves as the attachment point for the distal end of the flexible brake cable 10, which connects proximally to the braking device of the bicycle. The brake cable sheath of the flexible brake cable assembly 10 is positioned within a cable-guiding seat formed with the proximal end of the base mounting sheath bushing 7.

In one embodiment of the invention, the degree of rotation of the actuating handle grip 6 required for either scrubbing speed or full range of braking can range from approximately 1 to approximately 90 degrees.

In another embodiment of the invention, the rotational torque surge brake can be mounted on either right or left aerobar assembly 9, and brake either the back or the front wheel. Additionally a brake can be mounted on both left and right aerobar assemblies 9 for braking control of both wheels.

In yet another embodiment of the invention, the wheel braking device includes a spring loading means forcing the braking device and connecting cable away from the braking position, and the relative location upon the actuating handle grip 6 of the joining means is selected so that the actuating handle grip 6 is urged rotatably away from the braking position by the spring force.

In another embodiment of the invention, the base mounting sheath bushing may alternatively be replaced by other suitable bushing or bearing systems that allow the actuating handle grip 6 to be smoothly rotated around the aerobar assembly 9.

In yet another embodiment of the invention, the base mounting sheath bushing 7 and the actuating handle grip 6 components may be constructed of materials offering suitable strength and wear resistance while minimizing weight to the brake assembly, including, but not limited to plastic materials, including thermoset, thermoplastics, elastomer materials, and combinations of plastics with aluminum and/or composite materials such as carbon fiber.

It is to be understood by one of ordinary skill in the art that the present discussion is a description of exemplary embodiments only and is not intended as limiting the broader aspects of the present invention, which broader aspects are embodied in the exemplary construction. In fact, it will be apparent to those skilled in the art that various modifications and variations can be made in the present invention without departing from the scope or spirit of the invention. For instance, features illustrated or described as part of one embodiment can be used in another embodiment to yield a still further embodiment. It is intended that the present invention cover such modifications and variations as come within the scope of the appended claims and their equivalents.

The invention claimed is:

1. For a bicycle having a forward and rearward wheel, handle bars, a frame upon which the wheels are rotatably mounted, a flexible cable operable braking device for at least one of the wheels, a pair of aerobar assemblies affixed to the handle bars and extending in the direction generally parallel to a path of travel of the bicycle, and a sheathed flexible brake cable assembly comprising a flexible brake cable and brake cable sheath connected to said braking device and extending therefrom to at least one of said aerobar assemblies, an aerobar-mounted rotational torque surge braking system comprising:
   one or more base mounting sheath bushings fixedly secured coaxially to at least one of said aerobar assemblies;
   at least one actuating handle grip rotatably mounted to said base mounting sheath bushing coaxially therewith;
   wherein an end of at least one of said flexible brake cables is attached to said actuating handle grip by an anchor, the actuating handle grip imparts a motion to the flexible brake cable in a radial direction relative to an axis of said flexible brake cable to produce axial tensioning of said flexible brake cable relative to the direction of the bicycle's travel; and
   a shifter cable transition piece and cable shifter lever attached to said aerobar assembly while still allowing radial rotation of said actuating handle grip.

2. The bicycle braking assembly of claim 1, wherein said anchor further comprises:
   a slotted brake cable endstop anchoring seat for said flexible brake cable formed within said actuating handle grip; and
   a radiused transition channel in said base mounting sheath bushing for said flexible brake cable; and
   an embedded seat to anchor the brake cable sheath into the proximate end of said base mounting sheath bushing.

3. The bicycle braking assembly of claim 1, wherein a range of radial rotation of the grip assembly required for slowing or complete braking ranges from approximately 5 to approximately 30 degrees.

4. The bicycle braking system of claim 1, wherein:
   an unobstructed channel is provided within said braking assembly traversing along or through, and coaxially therewith, an axis of said aerobar assembly to allow for passage of a gear shifter cable along the axis of said aerobar assembly, without restricting said radial rotation of said actuating handle grip.

5. The bicycle braking system of claim 1, further comprising:

a shifter cable transition piece; and a fastening mechanism for attachment of a shifter assembly to the distal end of said aerobar assembly.

6. The bicycle braking system of claim 1, wherein said flexible cable operable braking device further comprises a spring that forces said braking device and said sheathed flexible brake cable assembly away from a braking position, and wherein a relative location upon said actuating handle grip is selected so that said actuating handle grip is urged rotatably away from the braking position by said spring.

7. For a bicycle having a forward and rearward wheel, handle bars, a frame upon which the wheels are rotatably mounted, a flexible cable operable braking device for at least one of the wheels, a pair of aerobar assemblies affixed to the handle bars and extending in the direction generally parallel to a path of travel of the bicycle, and a sheathed flexible brake cable assembly comprising a flexible brake cable and brake cable sheath connected to said braking device and extending therefrom to at least one of said aerobar assemblies, an aerobar-mounted rotational torque surge braking system comprising:

one or more base mounting sheaths fixedly secured coaxially to at least one of said aerobar assemblies;

at least one actuating handle grip having bearings rotatably mounted on said aerobar assemblies coaxially therewith;

wherein an end of at least one of said flexible brake cables is attached said actuating handle grip by an anchor, the actuating handle grip imparts a motion to the flexible brake cable in a radial direction relative to an axis of said flexible brake cable to produce axial tensioning of said flexible brake cable relative to the direction of the bicycle's travel; and a shifter cable transition piece and a cable shifter lever attached to said aerobar assembly while still allowing rotation of said actuating handle grip.

8. The bicycle braking assembly of claim 7, wherein said anchor further comprises:

a slotted brake cable endstop anchoring seat for said flexible brake cable formed within said actuating handle grip; and a radiused transition channel in said base mounting sheath for said flexible brake cable; and an embedded seat to anchor the brake cable sheath into the proximate end of said base mounting sheath.

9. The bicycle braking assembly of claim 7, wherein a range of radial rotation of the grip assembly required for slowing or complete braking ranges from approximately 5 to approximately 30 degrees.

10. The bicycle braking system of claim 7, wherein:

an unobstructed channel within said braking assembly traversing along or through, and coaxially therewith, an axis of said aerobar assembly to allow for passage of a gear shifter cable along the axis of said aerobar assembly, without restricting said radial rotation of said actuating handle grip.

11. The bicycle braking system of claim 7, further comprising:

a shifter cable transition piece; and a fastening mechanism for attachment of a shifter assembly to the distal end of said aerobar assembly.

12. The bicycle braking system of claim 7, wherein said flexible cable operable braking device further comprises a spring that forces said braking device and said sheathed flexible brake cable assembly away from a braking position, and wherein a relative location upon said actuating handle grip is selected so that said actuating handle grip is urged rotatably away from the braking position by said spring.

* * * * *

UNITED STATES PATENT AND TRADEMARK OFFICE
CERTIFICATE OF CORRECTION

PATENT NO. : 10,124,856 B2
APPLICATION NO. : 15/330552
DATED : November 13, 2018
INVENTOR(S) : Jeffrey John Cederstrom It is certified that error appears in the above-identified patent and that said Letters Patent is hereby corrected as shown below:

In the Claims

Column 7, Line 35, Claim 7 after "allowing" insert --radial--.

Signed and Sealed this
Second Day of April, 2019

Andrei Iancu
*Director of the United States Patent and Trademark Office*